(No Model.)

W. T. BARKER.
BICYCLE.

No. 586,002.   Patented July 6, 1897.

Witnesses.
B. H. Jones.
Byron E. Parks.

Inventor.
Wells T. Barker
By Ithiel J. Cilley
Attorney.

UNITED STATES PATENT OFFICE.

WELLS T. BARKER, OF NASHVILLE, MICHIGAN.

BICYCLE.

SPECIFICATION forming part of Letters Patent No. 586,002, dated July 6, 1897.

Application filed April 17, 1896. Serial No. 588,020. (No model.)

*To all whom it may concern:*

Be it known that I, WELLS T. BARKER, a citizen of the United States, residing at Nashville, in the county of Barry and State of Michigan, have invented certain new and useful Improvements in Bicycles, of which the following is a specification.

My invention relates to improvements in the propelling mechanism of bicycles; and its objects are, first, to provide for instantly changing the gear of the wheel to accommodate it to the various conditions of the road, and, second, to provide a means whereby the pedals may be made to remain stationary, if desired, when the wheel is in motion, as in coasting, &c. I attain these objects by the mechanism illustrated in the accompanying drawings, in which—

Figure 1:
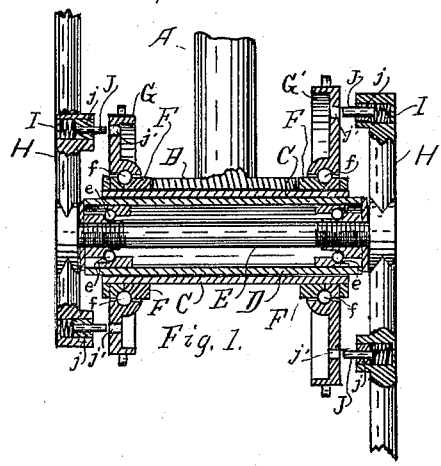
Figure 2:
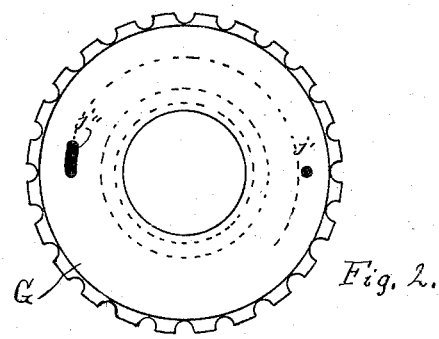
Figure 3:
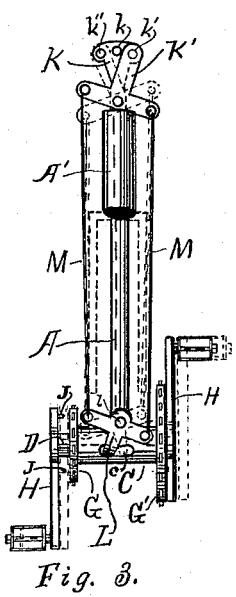
Figure 4:
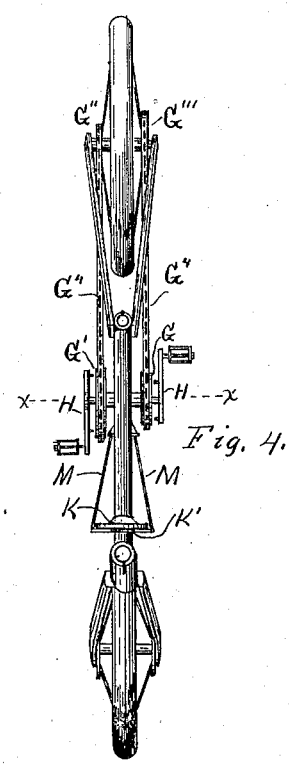

Figure 1 is a vertical section of my appliance on the line $x\,x$ of Fig. 4. Fig. 2 is an elevation of the sprocket-wheel, showing the position and forms of the apertures forming part of the clutch. Fig. 3 is a front elevation of the frame with the wheels and handle removed to show the means of operating my device; and Fig. 4 is a plan of the bicycle with the handles and seat removed, showing the manner of connecting the drive-chains to the wheel.

Similar letters refer to similar parts throughout the several views.

A is the depending post of the bicycle, to which the pedal-shaft is secured.

B is a hub on the lower end of the same for holding the bearing that receives the transfer-cylinder. This hub extends but part of the way around the bearing C and is securely attached thereto, as by brazing or otherwise.

C is an annular bearing secured to the hub B at the lower end of the post A, and is designed as a bearing or support for the cylinder-bearing D, which is slidingly supported therein.

The pedal-shaft E is supported to revolve freely within the cylinder D upon ball-bearings $e$, so that friction is reduced to the minimum.

The sprocket-wheels G and G' are supported to turn freely on the ball-bearings F, which are securely attached to the bearing C of the frame.

The pedal-arms H are securely attached to the ends of the shaft E directly at the ends of the cylinder D, with sufficient clearance to avoid friction. These arms are provided with two pins J in position to interlock with corresponding apertures $j'$ and $j''$ in the sprocket-wheels G to form clutches to connect the pedal-arms with one or the other of the sprocket-wheels. I place bushings $j$, to form bearings around these pins, in the pedal-arms, and to insure a full, perfect union of the clutches I place a spring I back of each pin, so that they may be pressed back into the arm when bearing upon the solid portion of the sprocket-wheel in approaching and will spring quickly forward into the apertures when reaching them. I make one or more pairs of these apertures in each sprocket-wheel, and one aperture of each pair long, as shown at $j''$ in Fig. 2, so that one of the pins will fully enter therein before the other pin reaches its aperture and check the motion of the pedal-arm sufficiently so that the second pin will invariably enter its aperture.

In order that each pin will enter only the aperture designed, I place one of the apertures $j''$ nearer the radial center of the wheel than the other, as shown by the dotted lines in Fig. 2.

The sprocket-wheel G is considerably smaller than G' and the two are connected with corresponding sprocket-wheels G'' and G''' on the shaft that supports the hind wheel by means of sprocket-chains $G^4$, so that the motion of the bicycle may be governed by shifting the pedal-shaft so that the clutches will engage the larger or the smaller sprocket-wheel according as it is desired to increase the speed or the leverage upon the bicycle.

The cylinder D is made enough longer than the bearing C to allow both sets of pins J to be wholly disengaged from the sprocket-wheels, so that the bicycle may be allowed to coast with the pedals idle.

To shift the cylinder and pedal-arms to engage the larger or the smaller sprocket-wheel at pleasure, I pivot a T-lever K' to a bearing K at the top of the frame just back of the yoke-support A' and connect the two lateral arms of this lever by means of the rods M with the lateral arms of the shifter L, which is pivoted to the lower end of the post A and has a downwardly-projecting arm designed to project through the slot c in the bearing C and engage with the cylinder, so that when the arm K' is placed at K the clutcher will be wholly disengaged, as in Figs. 1 and 4. When thrown over to k', the larger sprocket will be engaged, as in Fig. 3, and the speed increased, and when thrown to k'' the smaller sprocket-wheel will be engaged, as per dotted lines, and the leverage increased.

It will be noticed that there is no possible opportunity for the shaft E to slide endwise in the cylinder D, so that the movement of the cylinder-bearing will invariably insure the desired action of the clutches.

Having thus fully described my invention, what I claim as new, and desire to secure by Letters Patent of the United States, is—

1. The combination, with a bicycle-frame, of a longitudinally-adjustable support for the pedal-shaft and means for adjusting said support, sprocket-wheels revolubly secured to the frame around said support, clutches for engaging the pedal-arms with said wheels, said clutches consisting of pins in said arms, springs for actuating said pins, and apertures in the wheels to receive said pins, one of said apertures being round and the other elongated, substantially as and for the purpose set forth.

2. The combination with a bicycle-frame, of a longitudinally-adjustable support for the pedal-shaft and means for adjusting said support; with sprocket-wheels revolubly secured to the frame around said support, and clutches for engaging the pedal-arms with said wheels, said clutches consisting of pins in said arms, springs for actuating said pins, and apertures in the wheels to receive said pins, one of said apertures being long and one round and said apertures varying in their distance from the radial center of the wheels substantially as and for the purpose set forth.

Signed at Nashville, in the county of Barry and State of Michigan, this 13th day of April, 1896.

WELLS T. BARKER.

In presence of—
LEN W. FEIGHNER,
C. L. GLASGOW.